UNITED STATES PATENT OFFICE 2,391,763

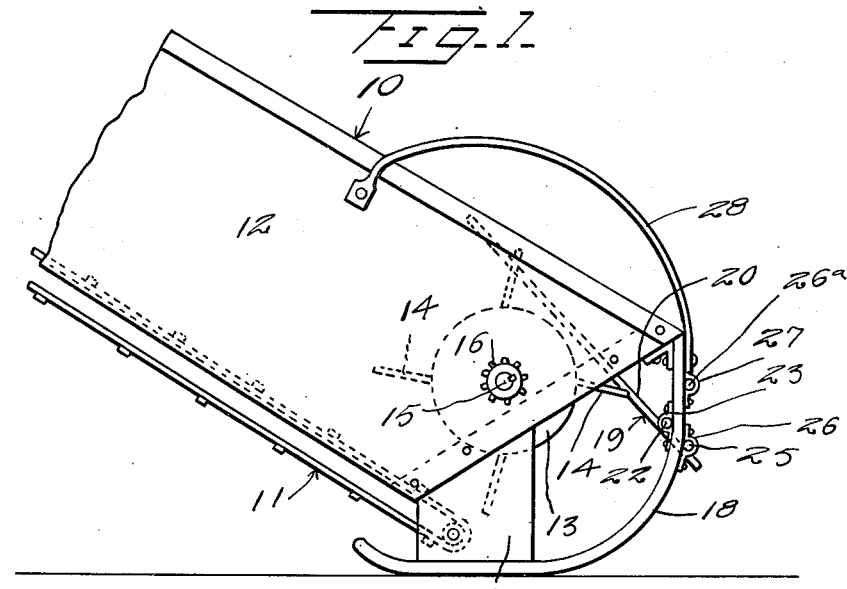
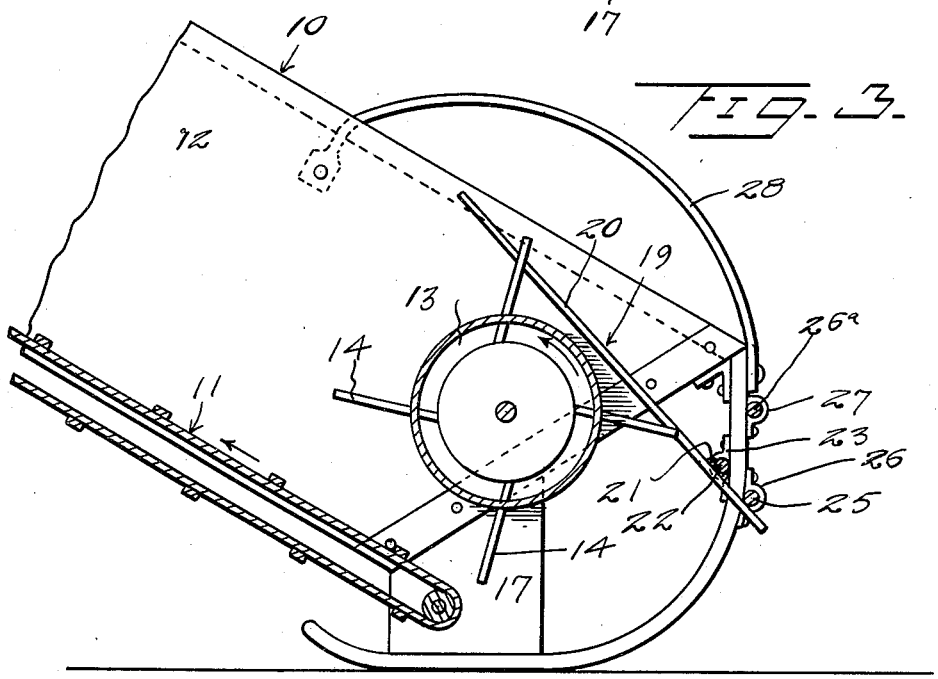

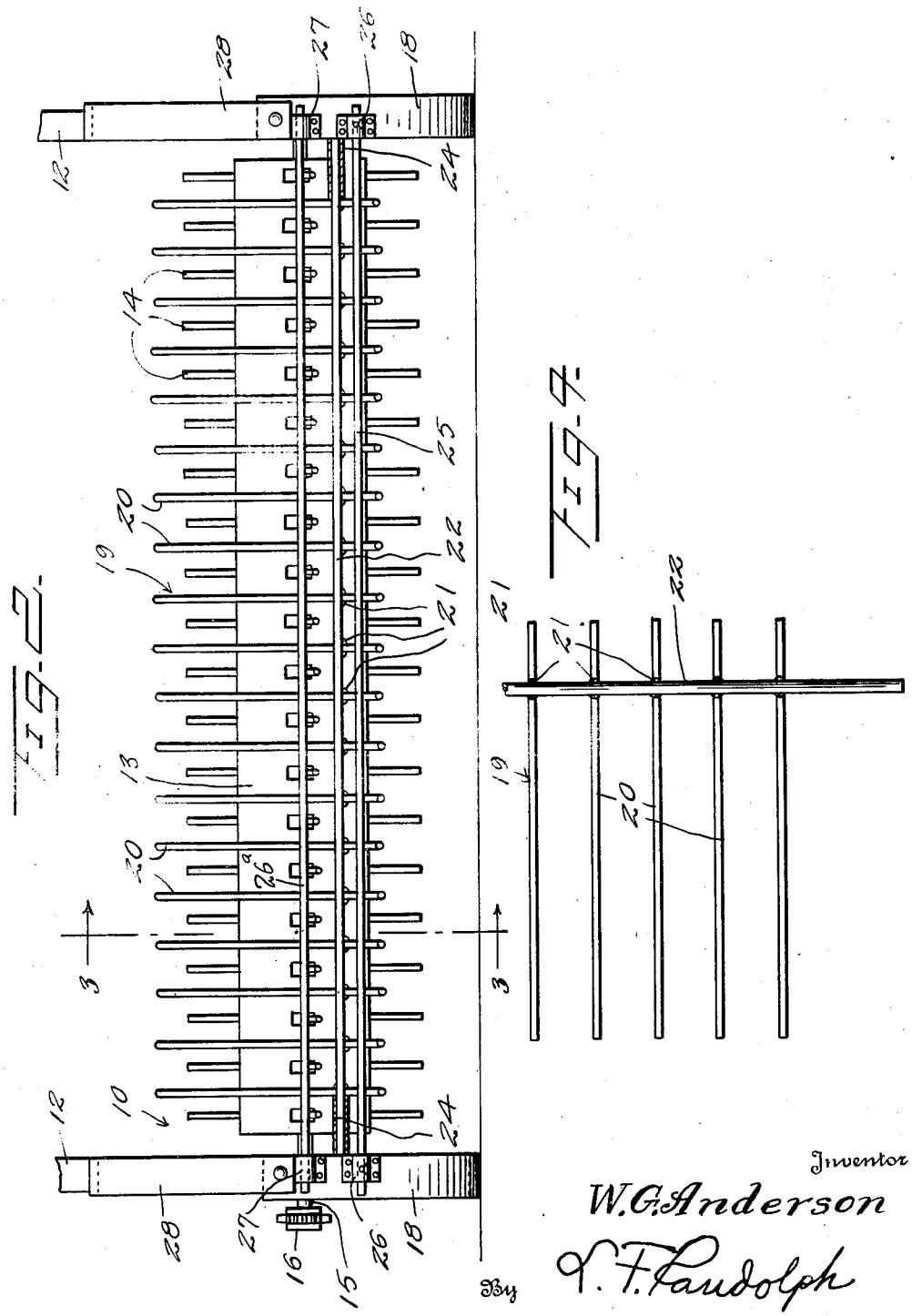

THIN SWATH BOOSTER

William G. Anderson, Kennedy, Minn.

Application November 26, 1943, Serial No. 511,858

2 Claims. (Cl. 56—351)

This invention relates to a booster or means to insure the effective loading for picking up of thin swaths by the pick-up mechanism of a combine.

It is particularly aimed to provide a novel construction which may be installed as an attachment or incorporated initially in the pick-up mechanism of a combine harvester, and one which comprises an element pivotally mounted and having a plurality of tines for coacting with the pick-up teeth of a revolving or loading drum, means being provided to maintain the tines at the proper angle, and additional means being employed to prevent undue displacing movement of such tines.

Various additional objects and advantages will become apparent from a consideration of the description following taken in connection with accompanying drawings illustrating an operative embodiment.

In said drawings—

Figure 1 is a view in side elevation of pick-up mechanism of a combine harvester, with my improvement associated therewith;

Figure 2 is a rear elevation of the parts of Figure 1;

Figure 3 is a vertical section taken on the plane of line 3—3 of Figure 2; and

Figure 4 is a fragmentary plan view of the tine body.

Referring specifically to the drawings wherein like reference characters designate like or similar parts, 10 generally designates the pick-up mechanism of a combine harvester of conventional construction. Such mechanism includes an endless conveyor 11 in the base thereof with side walls 12 flanking the same, and mounting a revolving drum 13 equipped with approximately radial pick-up teeth 14. Drum 13 is carried by an operating shaft 15 journaled directly in the walls 12 and having a gear 16 keyed thereto so that power from any suitable source may be transmitted to the drum. Standards 17 are attached to the sides 12 and depend below the same. Shoes 18 are fastened to the lower ends of the standards 17 and have their upper ends fastened to the rear upper edges of the sides 12.

In carrying out my invention, I provide a tine body generally designated 19 and detailed in plan in Figure 4. This body comprises a plurality of metallic tines 20, preferably straight and in parallelism and welded or otherwise rigidly secured at 21 to a rocker rod 22. The rod 22 at opposite end portions is journaled in bearings 23 fastened to the inner surfaces of the shoes 18, and sleeves 24 may be interposed on the rod between the outer most tines and the bearings in order to maintain the tine body 19 in proper position. The outer ends of the tines 20 are adapted to extend under and abut a rod 25 which is fastened in suitable brackets 26 secured to the outer surfaces of the shoes 18. It will be noted that the rod 25 is lower than the rocker rod 22 in order to normally position the tine body 19 at the proper angle as in Figures 1 and 3, with the tines 20 intermediate adjacent pick-up teeth 14 and relatively close to the drum 13, between adjacent teeth but not in contact with the drum.

In order to prevent the body 19 from falling backwards in use, an additional rod 26a is fastened against the outer face of the shoes 18 by suitable brackets 27, the same being located above the rocker rods 22.

As a result of the construction described, with the drum 13 operating counter-clockwise as shown by the direction arrows in Figure 3, thin swaths will be picked up by the teeth 14 and will enter the mechanism 10 across the top of the drum 13 and beneath the tine body. The invention will prevent the rolling of thin swaths as at present, in front of the pick-up drum, since it will insure the picking up thereof for movement onto the conveyor 11. Also, in windy weather, the tine body will prevent the swath from blowing to one side of the pick-up mechanism.

Guides 28 are secured to the sides 12 and shoes 18, as shown.

Various changes may be resorted to provided they fall within the spirit and scope of the invention.

I claim as my invention:

1. In combination with a pick-up mechanism including a rotary drum having pick-up teeth radiating therefrom, the mechanism having shoes extending forwardly of the drum, a tine structure including a rocker rod and a plurality of tines extending from the rod over the drum and relatively close to the teeth, means journaling said rod on the shoes, abutment means for the rod on the shoes, abutment means above the first abutment means to prevent the tines falling backwards, said abutment means being mounted on the shoes, and the axis of the tine structure being forwardly of the drum.

2. In combination with a pick-up mechanism including a rotary drum having pick-up teeth radiating therefrom, the mechanism having shoes extending forwardly of the drum, a tine structure including a rocker rod and a plurality of tines extending from the rod over the drum and relatively close to the teeth, means journaling said rod on the shoes, abutment means for the rod on the shoes, abutment means above the first abutment means to prevent the tines falling backwards, said abutment means being mounted on the shoes, and the axis of the tine structure being forwardly of the drum, said abutment means being in the form of rods bridging said shoes.

WILLIAM G. ANDERSON.